(12) United States Patent
Pannell et al.

(10) Patent No.: US 10,750,682 B1
(45) Date of Patent: Aug. 25, 2020

(54) APPARATUS FOR LAYING CASING LAYER OVER COMPOST FOR MUSHROOM CULTIVATION

(71) Applicant: Pannell Manufacturing Corporation, Avondale, PA (US)

(72) Inventors: Robert T. Pannell, Kennett Square, PA (US); Robert T. Pannell, II, Avondale, PA (US)

(73) Assignee: Pannell Manufacturing Corp., Avondale, PA (US)

( * ) Notice: Subject to any disclaimer, the term of this patent is extended or adjusted under 35 U.S.C. 154(b) by 0 days.

(21) Appl. No.: 16/738,167

(22) Filed: Jan. 9, 2020

(51) Int. Cl.
*A01G 18/22* (2018.01)
*A01G 18/20* (2018.01)

(52) U.S. Cl.
CPC ............. *A01G 18/22* (2018.02); *A01G 18/20* (2018.02)

(58) Field of Classification Search
CPC .................................. A01G 18/20; A01G 18/22
See application file for complete search history.

(56) References Cited

U.S. PATENT DOCUMENTS

| | | | | |
|---|---|---|---|---|
| 3,613,926 A | * | 10/1971 | Scroggins | B60P 1/38 414/503 |
| 3,743,117 A | * | 7/1973 | Frezzo | A01G 18/60 414/312 |
| 3,945,512 A | | 3/1976 | Pannell | |
| 4,170,432 A | * | 10/1979 | Pia | A01G 18/20 414/269 |
| 4,273,495 A | | 6/1981 | Pannell | |
| 4,371,305 A | | 2/1983 | Pannell | |
| 4,457,630 A | | 7/1984 | Pannell | |
| 6,018,906 A | | 2/2000 | Pia | |
| 8,069,608 B1 | | 12/2011 | Pannell | |
| 8,205,379 B2 | | 6/2012 | Pannell | |
| 8,561,344 B2 | | 10/2013 | Pannell | |
| 8,869,691 B1 | | 10/2014 | Pannell | |
| 10,004,182 B1 | | 6/2018 | Pannell | |
| 10,159,199 B1 | | 12/2018 | Pannell | |
| 2011/0094154 A1 | | 4/2011 | Joaquin | |

* cited by examiner

*Primary Examiner* — Saul Rodriguez
*Assistant Examiner* — Ashley K Romano
(74) *Attorney, Agent, or Firm* — Rogowski Law LLC

(57) ABSTRACT

An apparatus for depositing a particulate material onto mushroom compost has a distributor box configured to receive the particulate material, such as mushroom casing, and a moving belt that is fed from a roller into the bottom of the box and exits from a discharge opening of the distributor box. A net pulley roller associated with the moving belt is pulled to advance the moving belt. A ribbed roller mounted for rotation at or near the discharge opening of the distributor box scrapes the particulate material out of the distributor box and deposits the particulate material onto the top surface of the moving belt. The particulate material then rides on the top surface of the moving belt until it drops off the belt onto the mushroom compost at the belt reversal point.

12 Claims, 4 Drawing Sheets

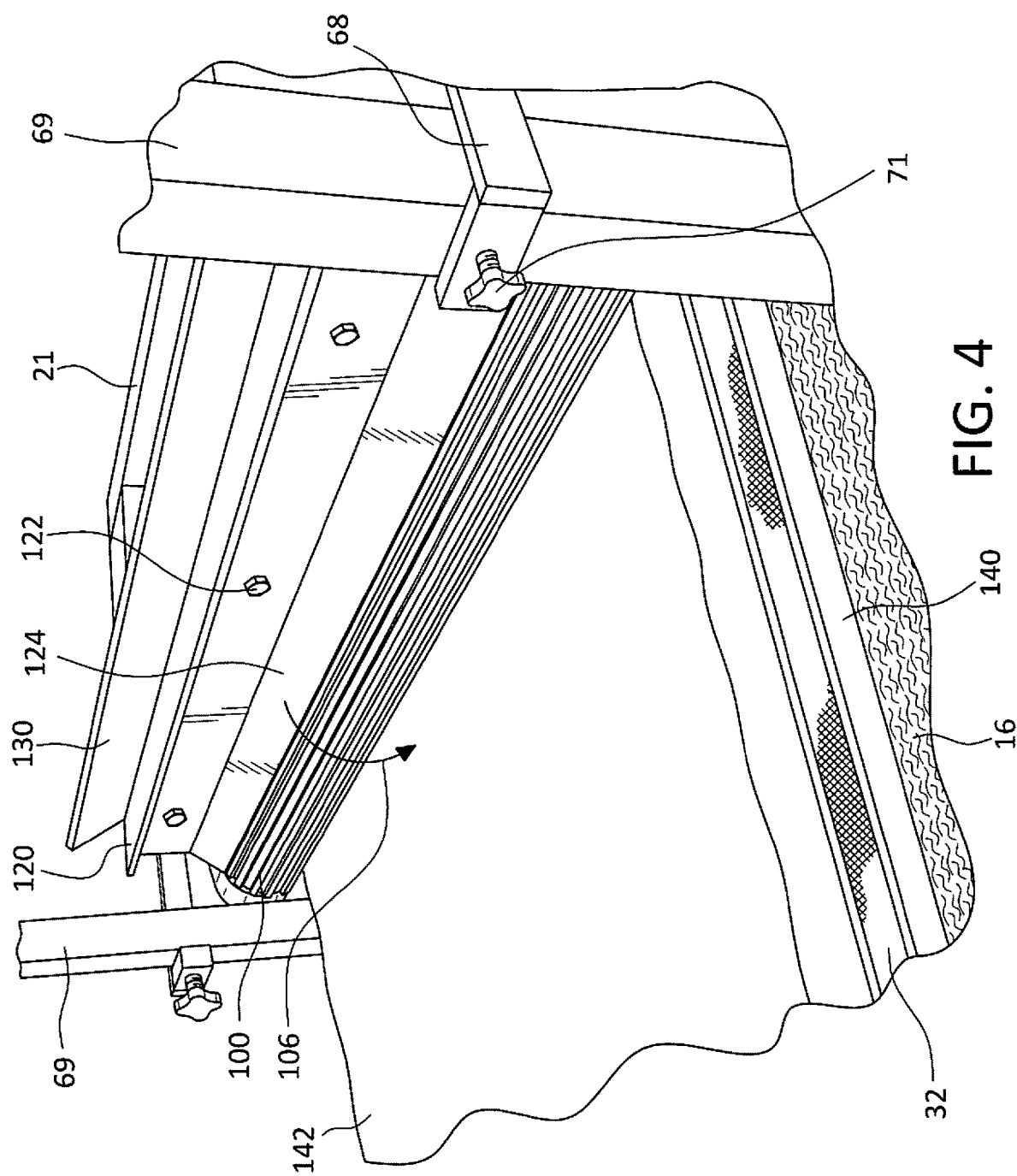
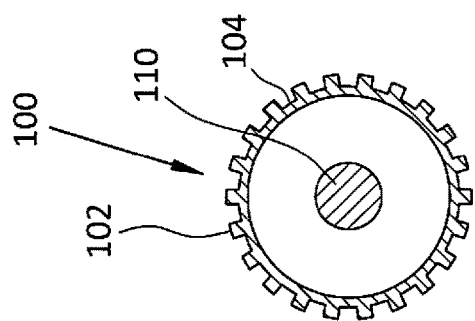
FIG. 5
FIG. 4

APPARATUS FOR LAYING CASING LAYER OVER COMPOST FOR MUSHROOM CULTIVATION

BACKGROUND

Mushroom farming comprises generally six steps: (1) Phase I composting; (2) Phase II composting; (3) spawning; or (2a/3a) Phase III composting; (4) casing; (5) pinning; and (6) cropping. The most used and least expensive mushroom compost is straw-bedded horse manure to which nitrogen supplements and a conditioning agent, such as gypsum, are added. After the compost ingredients have been mixed, watered and aerated in Phase I for a requisite number of days, the compost is pasteurized in Phase II. Pasteurization kills insects, unwanted fungi or other pests that may be present in the compost.

In a mushroom growing operation using the shelf system, mushrooms are grown in shelves which are about 65 inches wide and about 60 feet long. These shelves are usually stacked in a superimposed position, six or so in a tier, in adjacent tiers that are about 12 feet high. The vertical distance between the superimposed shelves is about 24 inches. In mushroom growing houses, two to four of the tiers may be placed in a single growing room. The aisles between adjacent tiers are generally about 32 inches wide. The head room from the top of the top shelf to the ceiling is also usually limited to about 3 feet. At the front and rear of each tier, only about 3 feet of space is left between the shelf and the respective wall of the mushroom growing house. To complicate material handling, the only access into the growing rooms usually is a door which is about 32 inches wide and only about 6 feet high. There is very limited room for machinery and attendant personnel to maneuver between tiers and into individual shelves.

In the cultivation of mushrooms, a growing medium (compost) is placed in each of the shelves to a depth of about 12 inches. After all of the shelves in a growing room are filled with the compost, the compost may be compacted or leveled by compressing with a roller. Suitable equipment for such compacting is shown, for example, in U.S. Pat. Nos. 8,561,344; 8,205,379 and 8,069,608.

Thereafter, the entire room is sealed off, and the compost is allowed to heat up thereby completing pasteurization. Or, the grower places pre-pasteurized compost onto the shelves. After pasteurization, the compost is spawned (planted with the seed). Approximately 14 days after spawning, the compost is covered with a layer of soil (casing) to induce fruiting of the mushrooms. While casing can be dumped by bucket and raked onto the compost bed manually, more commonly a material handling apparatus such as shown in U.S. Pat. No. 4,371,305 can be used. The material handling apparatus of the '305 patent has a distributor box that deposits casing material onto a horizontally moving belt from which the casing is discharged onto the prepared bed of mushroom compost at the reversal point of the unwinding belt. Within the distributor box is a rotating auger to break up the soil and direct it downwardly to a gap between the bottom of the front wall of the distributor box and the moving belt. Also within the distributor box is a reciprocating device with a bar from which teeth extend. The bar is oscillated or reciprocated from side to side. The teeth associated with the bar sweep back and forth to dislodge clumps and stones in the casing soil, thereby preventing clogging of the gap between the bottom of the front wall of the distributor box and the moving belt. A cut-off plate is angled into the distributor box in advance of the gap. The contents of U.S. Pat. No. 4,371,305 are incorporated herein by reference.

Mushroom growers have in recent times changed the type of casing that is deposited onto the prepared mushroom compost bed from soil to a peat moss. The peat moss comprises lighter, finely divided particles with a preferred moisture content of from about 80% to 85%. It has been found that material handling apparatus such as that shown in the '305 patent is not effective to lay this type of peat moss casing in a uniform layer onto a prepared bed. Accordingly, improvements to preparing beds for mushroom cultivation continue to be sought.

While certain aspects of prior art methods and apparatus for preparing beds for mushroom cultivation have been discussed, aspects of these systems are in no way disclaimed and it is contemplated that the claimed invention may encompass one or more aspects of the prior art devices discussed herein.

SUMMARY OF THE INVENTION

For mushroom growing, it is desired to deposit a layer of casing material to a uniform depth upon the surface of an elongated bed or upon the surface of a compost layer in an elongated bed. An apparatus for depositing particulate casing material includes a distributor box mounted near one end of the surface. The distributor box has an elongated discharge opening disposed toward the surface and has a length generally corresponding to a width of the surface. A belt is mounted at one end to a supply roller and is anchored at its other end near the one end of the surface with a portion of the belt rolled around the supply roller. The belt passes through the lower portion of the distributor box and emerges from the distributor box through the discharge opening. The belt is unwound from the supply roller and moved toward the other end of the surface. The belt has a movable reversal point as it is moved over the surface, and the belt is rewound on the supply roller with the movable reversal point thereby moving back toward the one end of the surface. Particulate material (mushroom casing) fed into the distributor box is deposited on the belt and carried by the belt toward the other end of the surface as the belt reversal point moves toward the other end of the surface. The particulate material is then deposited on the surface as the belt reversal point moves toward the other end of the surface.

Improving upon prior art apparatus for depositing particulate material (casing), the apparatus of the current invention includes a ribbed roller rotatably driven at the discharge opening of the distributor box configured to scrape particulate casing material in the distributor box and deposit such particulate casing material onto the surface of the belt, wherein the belt defines the lower end of the discharge opening. The ribbed roller breaks up clumps of moist particulate material and forcibly removes the particulate material from the trough to be deposited on the moving belt.

The apparatus according to the invention is configured especially to deposit a uniform layer of peat moss as mushroom casing over a previous layer of mushroom compost.

The apparatus preferably includes a net pulley roller configured to support the belt at the movable reversal point of the belt. The apparatus optionally includes an idler roller to compress the compost before depositing the mushroom casing on the compost.

A bar may be mounted outside of the distributor box so that it extends from a first sidewall of the distributor box to an opposite sidewall of the distributor box at the discharge opening of the distributor box. The top surface of the bar may be contiguous with the plane of the bottom of the distributor box, so that the bar supports the belt as the belt exits the distributor box.

DESCRIPTION OF THE DRAWINGS

The foregoing summary, as well as the following detailed description of the invention, will be better understood when read in conjunction with the appended drawings. For the purpose of illustrating the invention, the drawings show presently preferred embodiments. However, the invention is not limited to the precise arrangements and instrumentalities shown.

FIG. 4 is a right side perspective view of the apparatus according to the invention of FIG. 1 showing a ribbed roller depositing casing from the distributor box onto the belt or net over the compost layer; and FIG. 5 is a cross-sectional view of the ribbed roller shown in FIG. 4.

DETAILED DESCRIPTION OF EMBODIMENTS

Figure 1:
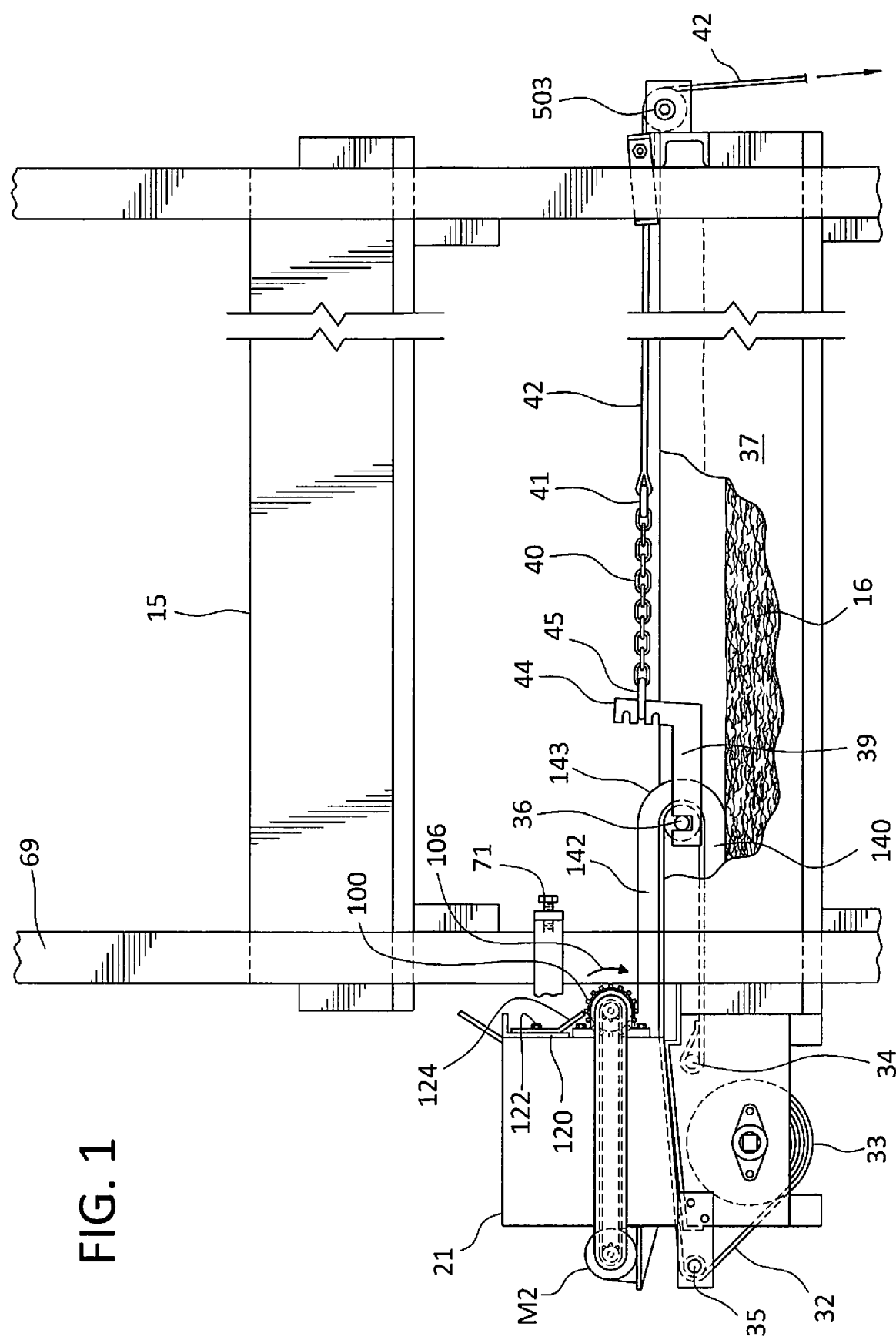
FIG. 1 is a side elevation, partially broken away, depicting an embodiment of an apparatus according to the invention for laying a casing layer over prepared mushroom compost bed.

Certain terminology is used in the following description for convenience only and is not limiting. The words "lower," "bottom," "upper," "top," "right" and "left" designate directions in the drawings to which reference is made. The words "inwardly," "outwardly," "upwardly" and "downwardly" refer to directions toward and away from, respectively, the geometric center of the headrest, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Turning in detail to the drawings, FIG. 1. illustrates two shelves 15 that hold mushroom compost 16 and casing layers 18 deposited over the mushroom compost 16. Each of the shelves 15 is supported by vertical posts 69, with multiple shelves stacked one over the other forming a tier. Portions of two tiers are shown in FIG. 1.

Figure 2:
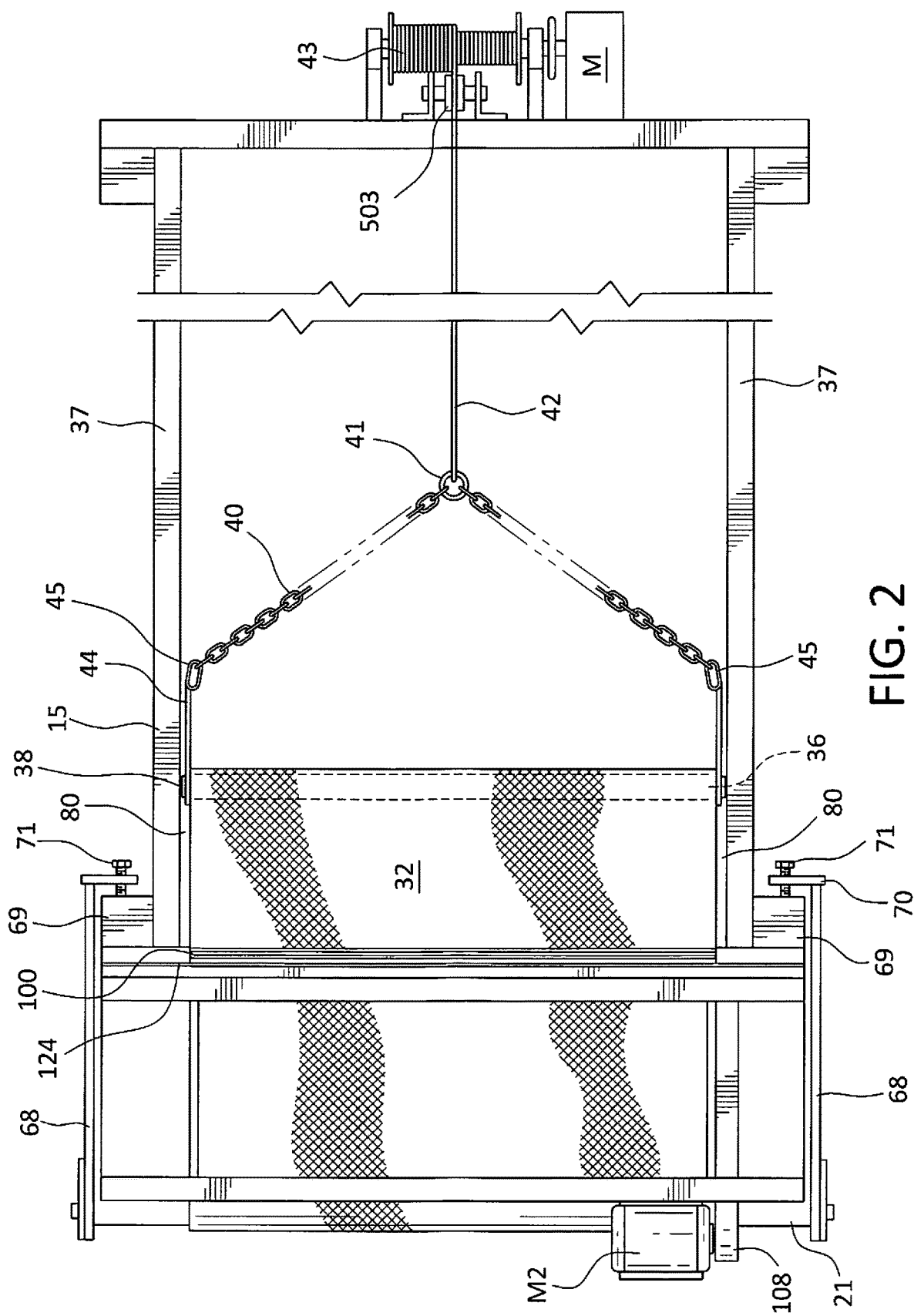
FIG. 2 is a top view of the apparatus according to the invention of FIG. 1.
Figure 3:
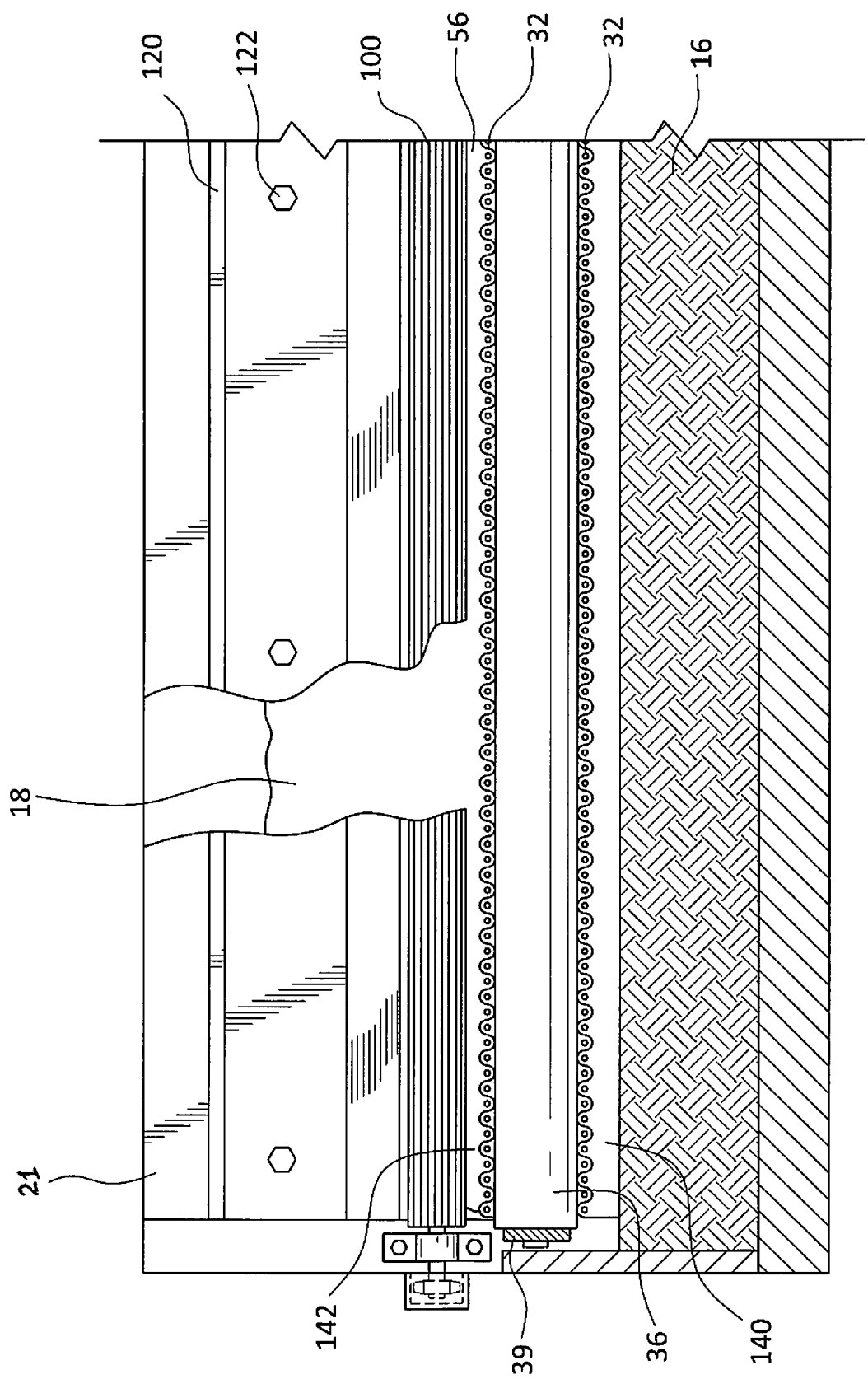
FIG. 3 is a front elevational view, partially broken away, of the apparatus according to the invention of FIG. 1.

The casing 18 is delivered to the distributor box 21, either by automated loading apparatus (not shown) or manually. The casing 18 ultimately contained in distributor box 21 is fed onto a belt or net 32 which is shown in FIG. 2 without any material, such as casing 18 thereon. The belt 32 is rolled up on a roller 33 shown in FIG. 1, with its other end anchored by clamp 34. The belt 32 passes over idler roller 35 into the bottom portion of the distributor box 21 to and around pulley roller 36 and then to anchor clamp 34. The axle of roller 36 extends beyond the edges of the belt 32 and is in close proximity to the side walls 37 of shelf 15. Mounted between the retainer 38 (FIG. 2) of said axle and the edge of belt 32 is a pulling bar 39, one at each edge. As shown in FIG. 2, each of the pulling bars 39 is attached by chains 40 to a pull ring 41 which, in turn, is connected to cable 42, which is windable on a winch 43 with a shaft 503 that is power driven by motor M. Other pulling arrangements can be used. Preferably any pulling arrangement used is readily coupled and uncoupled, since rollers 36 and 46 will be needed for each run to apply casing 18 over compost 16 on each shelf 15. Optional roller 46 is an idler roller which compresses the compost layer 16 making it more uniformly thick before applying the casing 18 in a layer thereon.

As belt 32 is being pulled forward by cable 42 and motor M and the various pulling elements just described, it unwinds from roll 33, into the bottom of distributor box 21, forming a floor of such distributor box 21. After exiting the distributor box 21, the portion of the belt 32 being played out gets laid down on top of the casing layer 140 which has just been deposited. See FIG. 1. The casing 18 in distributor box 21 has been forced out of the distributor box 21 by the moving belt 32, which carries a desired portion 142 of the casing 18 on the top surface of the belt 32. See FIG. 1. A portion 143 of the casing 18 then falls off the belt 32 at the reversal point of the belt 32. See FIG. 1. The belt 32 is of sufficient length to distribute casing 18 in a layer 140 over the compost 16 along the entire or substantially the entire length of the shelf 15. The rollers 36, 46 may then be separated from the belt 32, and the belt 32 may be rewound on roller 33 so that the apparatus may be re-used on a next shelf.

Casing 18 more frequently comprises a finely divided particulate peat moss mixture with a moisture content in the range of about 80% to 85%, and possibly higher. The peat moss mixture has finer particles and is lighter than the soil mixture that had been used for casing in prior years, but the peat moss mixture also has a higher moisture content. The peat moss mixture does not contain rocks or pebbles that were more commonly encountered with soil mixtures.

In accordance with the invention, at or near the bottom of the distributor box 21 and within a gap 56 between the front wall of the distributor box 21 and the moving belt 32, there is provided a ribbed roller 100 with a series of outwardly projecting parallel ribs 102 separated by troughs 104. The troughs 104 receive casing 18 from the bottom of the distributor box 21 and deposit the casing 18 onto the moving belt or net 32. Motor M2 drives belt 108 and the belt 108 causes the axle 110 of the roller 100 to turn to drive the roller 100. As the ribbed roller 100 is rotated in the direction of arrow 106 (FIG. 4), the ribs 102 carve or scrape into the casing 18 held in the distributor box 21 to force the casing 18 into the troughs 104 to be carried out of the distributor box 21 and deposited onto the belt or net 32.

The ribbed roller 100 may be formed of a metal, such as aluminum or stainless steel, or may be formed of a metal coated with a slippery coating. The slippery coating may comprise a thermoplastic material, such as polyethylene terephthalate or polyurethane.

The action of the ribs 102 on the casing 18 in the distributor box precludes clumping or uneven distribution of the casing 18 that otherwise can occur with a straight edge cut-off plate, such as taught in U.S. Pat. No. 4,371,305. Without wishing to be bound by any one inventive theory, it is postulated that a straight edge cut-off plate used in the apparatus of the '305 patent provides too little surface area to smooth the finer-sized particulate peat moss material of current casings 18, and that an auger combined with oscillating fingers in the distributor box 21 such as shown in the '305 patent forces too much of the finer-sized particulate peat most material of current casings 18 away from the gap 56 without being laid on the belt 32. The ribbed roller 100 forces casing 18 out of the distributor box 21 so that a more uniform layer 142 of casing 18 is successfully laid on the belt 32, and in turn a more uniform layer 140 of casing 18 is deposited from the belt 32 onto the compacted compost 16. Neither an auger nor oscillating fingers need be provided in the distributor box 21 of the invention, thus simplifying the construction and operation of an apparatus to lay casing 18 over compost 16.

Bar 86 shown in FIG. 1 is needed to support the belt 32 just as it emerges from distributor box 21. The compost layer 16 may initially be of a height that is above belt 32 or it may be lower. If that height is not even with belt 32, the belt 32 must initially move upwardly or downwardly to begin its ride on top of the compost layer 16. If a downward pull is exerted on the belt 32 and it is not supported (bar 86 being absent), more casing 18 will be deposited onto the belt 32 than is desired. Bar 82 keeps proper tension on the belt 32 at or near the roller 100 so that only the desired amount of casing 18 passes onto belt 32.

FIG. 2 depicts clamps 68 at each end of the distributor box 21. Each clamp 68 has a clamp arm 70 and an adjusting nut 71, and pulls distributor box 21 up tightly against a respective upright 69 of a tier of shelves 15. Clamps 68 prevent undue movement of distributor box 21 that might disrupt the formation of a uniform layer of casing 18 or cause other problems. The clamps 68 are pivotably mounted to the distributor box 21 by respective clamp arms 70 and fit around a respective upright 69. The clamps 68 may be removed by loosening the adjusting nut 71 and pivoting each clamp 68 away from the upright 69 to which it had been attached.

FIGS. 1 and 2 show optional adjustment bars 44 attached to the pulling bars 39 used in connection with chains 40 and the other pulling elements used in the belt 32 movement. The adjustment bars 44 extend vertically and each has several notches therein, one above the other. By varying placement of the gripping elements 45 attached to the adjustment bars 44, the operator may vary the pressure of idler roller 46 on the compost layer 16. The higher the mounting elements 45 on the adjustment bars 44, the less the pressure on the deposited casing layer 140. Roller 46 moves on compost layer 16, and as it is pressed downwardly, it causes roller 36 to move upwardly. That upward movement reduces the pressure on deposited casing layer 140. The optional adjustment bars 44 are not essential, particularly where the distributing box 21 deposits a suitable layer of casing 18 on the belt 32, a portion of which 140 may be laid down in a desired layer thickness.

By using the apparatus of this invention, the casing layer may be deposited onto a compost layer with a minimum number of personnel. The equipment is easily installed and moved about even in the confined areas of conventional mushroom growing houses. Most importantly, a uniform layer of material, such as casing, can be formed. The width of the belt used conforms very closely to the width of the shelf of bed so that uniform layering even at the edges is readily achieved. The equipment allows one to prepare multiple tiers with considerably more ease and within much less time than manual applications. The distributing box with a rotating ribbed roller effectively deposits peat moss casing onto the moving belt, which in turn deposits a uniform layer of casing onto the compost layer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. In an apparatus for depositing particulate material for mushroom growing wherein the particulate material is to be deposited at a uniform depth upon the surface of an elongated bed or upon the surface of a compost layer in an elongated bed, the apparatus including a distributor box mounted near one end of the surface, the distributor box having an elongated discharge opening disposed toward the surface and of a length generally corresponding to a width of the surface, a belt mounted at one end to a supply roller and anchored at its other end near the one end of the surface with a portion of the belt rolled around the supply roller, the belt passing through the lower portion of the distributor box and emerging from the distributor box through the discharge opening, wherein the belt is unwound from the supply roller and moved toward the other end of the surface, with the belt having a movable reversal point as it is moved over the surface and wherein the belt is rewound on the supply roller with the movable reversal point thereby moving back toward the one end of the surface so that particulate material fed into the distributor box is deposited on the belt and carried by the belt toward the other end of the surface as the belt reversal point moves toward the other end of the surface and the particulate material is then deposited on the surface as the belt reversal point moves toward the other end of the surface, wherein improvement comprises:

a ribbed roller having in its outer surface a series of outwardly projecting parallel ribs separated by troughs, said ribbed roller being rotatably driven at the discharge opening of the distributor box above the belt, with at least a portion of the roller positioned outside of the distributor box, and where said ribbed roller is configured to push a portion of particulate material emerging from the distributor box into the distributor box as another portion of particulate material is deposited from the distributor box onto the surface of the belt at the discharge opening below the ribbed roller, and wherein the belt defines the lower end of the discharge opening.

2. The apparatus of claim 1, further comprising a motor directly r indirectly connected to drive the ribbed roller.

3. The apparatus of claim 1, wherein the ribbed roller has a slippery coating applied thereto.

4. The apparatus of claim 1, wherein the particulate material is mushroom casing deposited upon the top surface of compost.

5. The apparatus of claim 4, wherein the mushroom casing is peat moss.

6. The apparatus of claim 4, further comprising an idler roller configured to compress the compost before the mushroom casing is deposited on the compost.

7. The apparatus of claim 1, further comprising a net pulley roller configured to support the belt at the movable reversal point of the belt.

8. The apparatus of claim 1, further comprising a seal plate associated with the distributor box, said seat plate having a tip surface arranged adjacent outer surfaces of the elongated ribs of the ribbed roller as the ribbed roller is rotated.

9. The apparatus of claim 8, wherein the seal plate is joined to the distributor box with the tip surface outside a top portion of the discharge opening of the distributor box.

10. The apparatus of claim 9, wherein the distributor box has a front wall, and wherein the tip surface of the seal plate is at an angle to the front wall.

11. The apparatus of claim 1, wherein the outwardly projecting parallel ribs scrape the portion of particulate material at the discharge opening of the distributor box as the roller is rotated, as the other portion of particulate material is deposited on the surface of the belt.

12. The apparatus of claim 1, wherein tips of the outwardly projecting parallel ribs as the ribbed roller is rotated, move in a direction opposite relative to a direction of movement of the surface of the belt when said tips are closest to the surface of the belt.

\* \* \* \* \*